United States Patent [19]

Kubis

[11] Patent Number: 5,054,354
[45] Date of Patent: Oct. 8, 1991

[54] SAW BLADE

[76] Inventor: Leon Kubis, 8173 S. E. Cumberland Cir., Hobe Sound, Fla. 33455

[21] Appl. No.: 430,647

[22] Filed: Oct. 31, 1989

[51] Int. Cl.$^5$ .............................................. B27B 33/12
[52] U.S. Cl. ...................................... 83/835; 83/839; 83/845; 83/698
[58] Field of Search ................. 83/835, 839, 840, 854, 83/855, 698, 845; 76/112, 101 A

[56] References Cited

U.S. PATENT DOCUMENTS

| 174,216 | 2/1876 | Emerson | 83/845 |
|---|---|---|---|
| 1,326,797 | 12/1919 | Sly et al. | 83/845 |
| 2,965,143 | 12/1960 | Feldmann et al. | 83/855 |
| 3,528,465 | 9/1970 | Omley | 83/835 X |
| 3,736,828 | 6/1973 | Funakubo | 83/661 |
| 3,885,488 | 5/1975 | Evancic et al. | 83/835 |
| 4,084,470 | 4/1978 | Reed | 83/841 |
| 4,135,414 | 1/1979 | Haug et al. | 76/101 A |
| 4,257,302 | 3/1981 | Heimbrand | 83/839 |
| 4,363,576 | 12/1982 | Zweekly | 83/845 X |
| 4,524,664 | 6/1985 | Tuomaala | 83/840 |

FOREIGN PATENT DOCUMENTS 120050  8/1927  Switzerland ........................ 83/839

Primary Examiner—Frank T. Yost
Assistant Examiner—Eugenia A. Jones

[57] ABSTRACT

A saw blade has a plurality of cutting members inserted into seatings in the blade body. The cutting members, in one example, are of sintered ceramic. A groove in one or both of the front and back surfaces of a cutting member cooperate with rib members on the blade body to give lateral location. The cutting members are gripped in the seatings, in one example by forcing over the front wall of a seating by driving in an oversize pin into an aperture at the bottom of a slot defining the front wall. In another example, cutting members and seatings have cooperating wedge formation to create a wedging action. A layer of synthetic resin adhesive is positioned between each cutting member and related seating. A very large reduction of noise during use occurs, and an increased productive life is obtained.

6 Claims, 2 Drawing Sheets

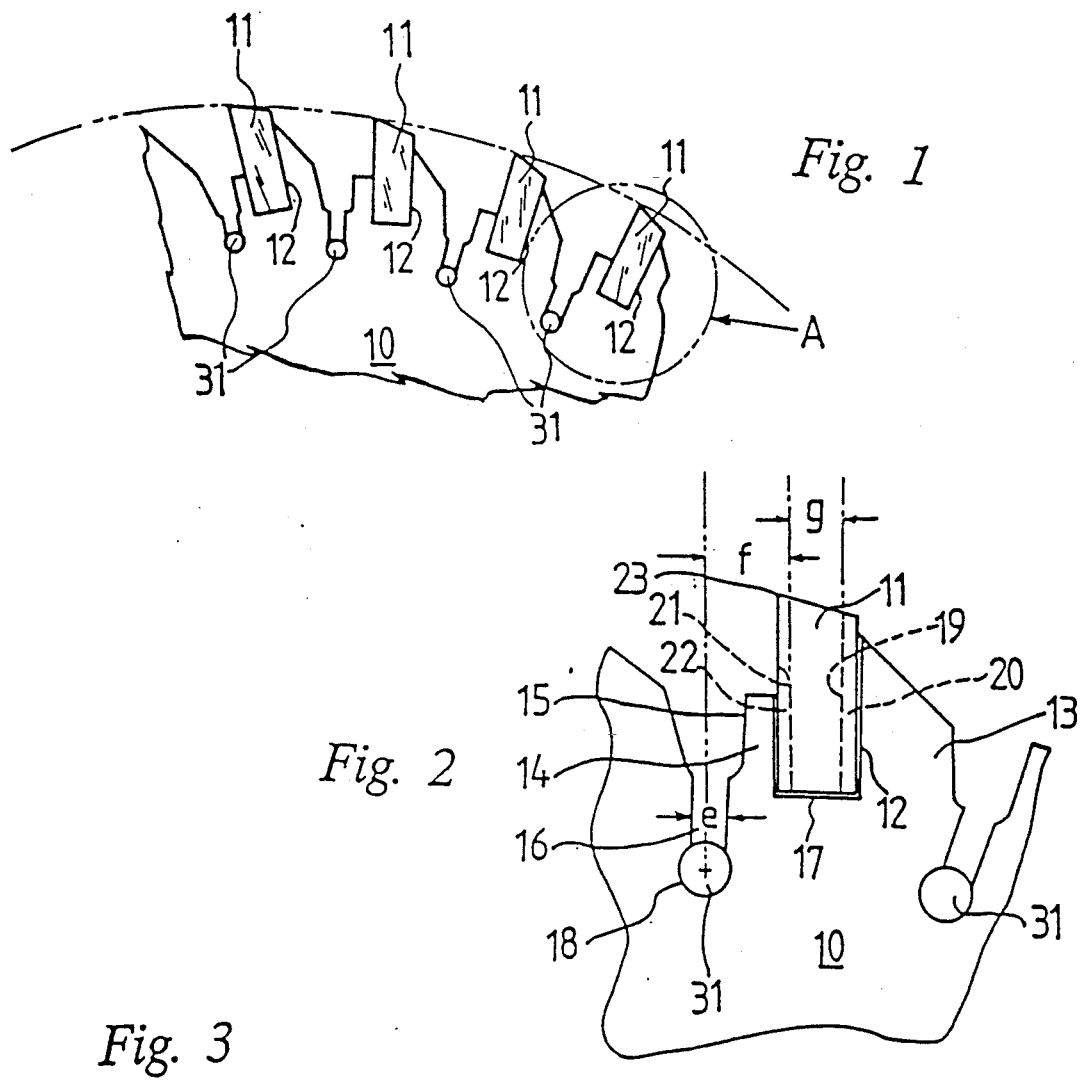
Fig. 1
Fig. 2
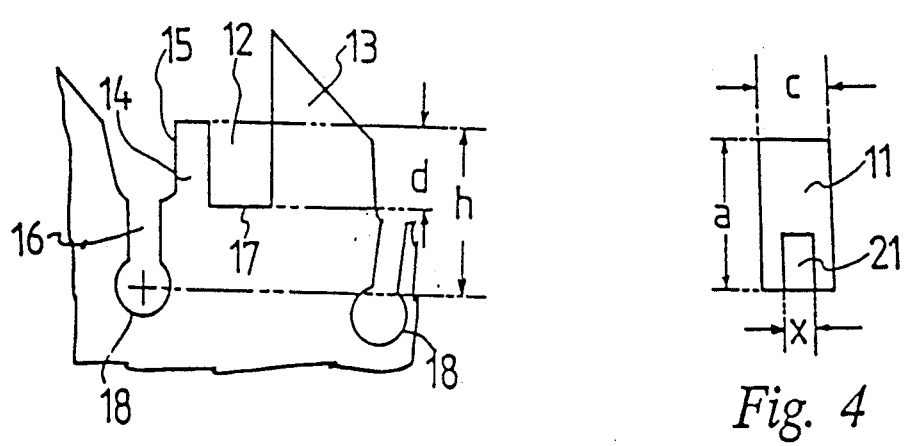
Fig. 3
Fig. 4

5,054,354

SAW BLADE

This invention relates to saw blades, and in particular to circular saw blades.

For a considerable time saw blades have been made with a main body portion of metal, for example, steel, with cutting members or teeth of sintered carbide brazed on to the body portion. Such blades give a substantially improved service compared to original blades where both the cutting members, or teeth, were also of metal, usually the same material as the main body portion. Increased cutting life, giving increased production between resharpening, or replacement, of teeth, makes it economic to use sintered carbide blades, even though they may be initially more expensive to buy. A major problem with saws, and particularly with the high rotational speed of circular saws, is noise. The level of noise produced during cutting can be hazardous, necessitating the wearing of ear mufflers.

The present invention provides an improved saw blade which provides for a considerable reduction in noise when cutting, particularly for circular saws, and, in a preferred form, gives a further large increase in cutting life.

A saw, in accordance with one aspect of the present invention, has a series of cutting members, or inserts, having formations cooperating with formations in the seatings for the cutting members, or inserts, and a layer of synthetic resin bonding each cutting member in its seating.

A saw, in accordance with a preferred form of the present invention, uses a sintered ceramic cutting member or insert. The insert is formed with one or more formations extending the length of the insert, for cooperation with formations in the seating for the insert. The insert is bonded into position by use of a synthetic resin adhesive. In a particular form, the insert sits in a recess or slot formed in the main saw body, with one part of the recess being levered over by the insertion of a pin. In another form the insert and the recess having cooperating tapered surfaces.

Broadly, in accordance with the present invention, a saw blade comprises a body and a plurality of cutting members, each cutting member comprising an insert positioned in a seating in the body, each insert and associated seating having cooperating formations for interval positioning of the insert, means for providing a clamping action for retention of the insert in the seating, and a layer of synthetic resin bonding the insert in the seating.

In one preferred arrangement in accordance with the invention, there is provided a saw blade having a plurality of cutting members, each member comprising a sintered ceramic insert positioned in a seating in the saw blade body, each insert and associated seating having cooperating formations for lateral positioning of the insert, means for providing a clamping action for retention of the insert in the seating, and a layer of synthetic resin adhesive bonding the insert to the seating. In accordance with one feature of the invention, one side of the seating is deformed into gripping engagement with the insert by the insertion of a pin. In accordance with another feature of the invention, an insert and the related seating have cooperating wedging surfaces.

Particularly, the saw is a circular saw, as are used for table saws, radial arm saws and other appliances using circular blades. The blades can be used for cutting wood, synthetic materials, and soft metals.

The invention will be readily understood by the following description of certain embodiments, by way of example, in conjunction with the accompanying drawings, in which:

FIG. 1 is a side view of part of a circular saw blade, embodying the invention;

FIG. 2 is an enlarged view of the part of the blade in the circle A of FIG. 1;

FIG. 3 is a side view of on one recess or seating of a saw blade;

FIGS. 4 and 5 are front and side views, respectively, of one form of insert or tooth;

Figure 5:
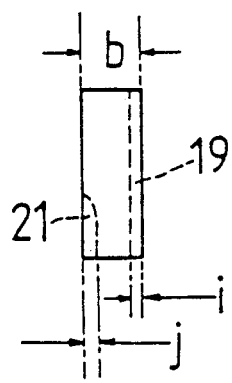

As illustrated in FIGS. 1 and 2, a saw blade 10, in the example a circular blade, has a series of insert cutting members, or teeth, 11 positioned along the edge, or periphery. The saw blade has a series of recesses or seatings 12 formed in the periphery, with a cutting member, hereinafter referred to as an insert, positioned in the seating.

As seen more clearly in FIG. 3, each seating is defined by a back wall member 13 and a front wall member 14. The back wall member is of substantial width at its base, in the plane of movement of the blade, forming a buttress. The front wall member is narrower and the front surface 15 is extended by a slot 16 extending below the bottom surface 17 of the recess 12. At the bottom of the slot 16 is a circular aperture 18.

In this embodiment, as seen in FIGS. 4 and 5, a groove 19 is formed in the back surface of the insert, extending the length of the insert, with a corresponding rib 20 formed on the front surface of the back wall member 13. In the front surface of the insert is formed a short groove 21, extending for part way from the inner end of the insert. A corresponding rib 22 is formed on the near surface of the front wall member. The front wall member extends for a shorter distance than the back wall member, to provide space for the cutting edge 23 of the insert.

The size of the insert, with the related features, will vary depending upon the size of the blade. For a circular saw blade of, for example, between 7" and 14" diameter, typical dimensions are as follows:

| | |
|---|---|
| overall length of insert | "a" = ½" |
| thickness of insert | "b" = 0.150" |
| width of insert | "c" = dependent on blade body thickness |
| depth of recess of front wall member | "d" = 0.125 ± 0.010" |
| diameter of aperture 18 | = 0.093" |
| width of slot 16 | "e" = 0.075" ± 0.005" |
| distance between center of slot 16 and aperture 18 and back surface of rib 22 | "f" = ¼" ± 1/64" |
| distance between front surface of rib 20 and back surface of rib 22 | "g" = 0.93" +0.002"/−0.003" |
| distance from center of aperture 18 to top surface of front wall member | "h" = 3/16" ± 1/64" |
| depth of groove 19 | "i" = 0.015" |
| depth of groove 20 | "j" = 0.030" |

A typical thickness of the saw blade body is, for example, about 0.085 inches or about 0.125 inches, but this also depends on the size of the blade. Generally, depending upon the thickness of the blade body, the ribs 20 and 22 are just extensions of the blade body, the width of the ribs being essentially the blade body thickness. Thus the widths of the grooves 19 and 21, i.e., the dimension x in FIG. 4, is usually equal to the blade body thickness. However, if desired, the ribs can be narrower than the thickness of the blade body.

Each insert 11 is seated in a recess or seating 12, the grooves 19 and 21 having ribs 20 and 22 seated therein. This provides lateral support against side shear forces in cutting. Prior to insertion of an insert into a recess, a layer of high strength synthetic resin adhesive, for example, Cyanoacrylate No. 421T, as sold by 3M Corporation, is applied to the front, back and bottom surfaces of the recess, or both. After insertion of the insert, it is held in position under pressure, until the adhesive has cured. The layer of synthetic resin is seen at 30 in FIG. 2. This layer is somewhat exaggerated in thickness in FIG. 2, for clarity.

After insertion of the insert, prior to curing of the adhesive, a pin is forced into the aperture 18. With a diameter of 0.093 inches for aperture 18, a 0.95 inch diameter pin is pushed in. The pins are indicated at 31 in FIGS. 1 and 2. The aperture 18 is accurately formed by reaming, and the pins are also accurately formed, as by grinding. The effect of pushing in the oversize pin is to bend the front wall member inwards, providing a mechanical clamping of the insert.

It has been found that the layer of synthetic resin 30 provides a very high level of damping, resulting in a very large decrease in the noise generated in use.

While it is usual to braze sintered carbide inserts in position, it is possible to retain such inserts in position using the bonding by a layer of synthetic resin and by providing a clamping action.

A particularly useful material for the insert is a sintered ceramic, such as Grade WG 300, manufactured by Greenleaf Corporation. The insert can be formed by cutting from a slab of green ceramic and molding to form the desired form, with grooves, followed by sintering. A further large increase in cutting life, over sintered carbide for example, is obtained.

It has been found that the mechanical clamping by the pin 31 can be sufficient to retain the insert in position during use, but the use of the adhesive adds approximately 25 percent to the strength of the positioning of an insert, with the major advantage of the reduction in noise produced during cutting. With carbide inserts or cutting members, the noise level during cutting can be of the order of 95 to 110 decibels. With the present tool, this noise level is greatly reduced, approaching what could be considered to be "silent" operation.

Figure 6:
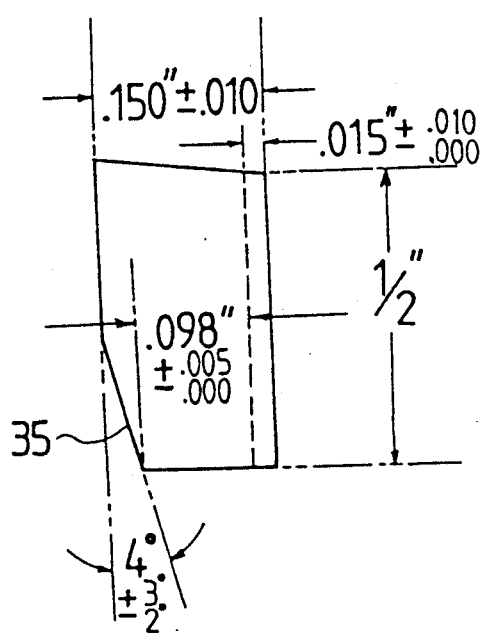
FIG. 6 is a side view of one alternative form of insert or tooth.
Figure 7:
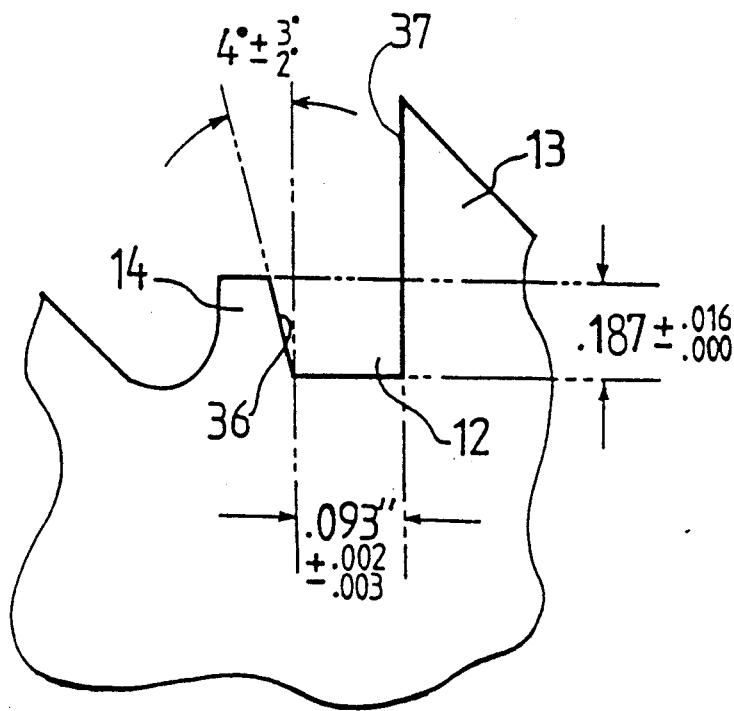
FIG. 7 is a side view of the related recess or seating in a saw blade for the insert illustrated in FIG. 6.

Instead of mechanically deforming the shape of the recess or seating to grip an insert, the insert and recess can be formed to give a wedging action. In such an arrangement, also, only one groove 19 is provided, on the near surface of the insert. FIG. 6 illustrates an insert, in side view, while FIG. 7 is a side view of a recess, the same reference numerals being used where applicable. An insert 11 is formed with an inclined surface 35 at the lower part, giving a tapered shape.

The recess 12 is formed with an inclined surface 36 at the front wall member 14, to give a tapered form to the bottom of the recess 12. The inclination of surfaces 35 and 36, with the tapered form of the base of the insert and the bottom of the recess, are complimentary, to give a tight wedging action of the insert in the recess. The dimensioning of the insert and recess is such that the insert cannot "bottom" on the bottom surface of the recess. A layer of adhesive is also applied to the insert, or recess, or both, prior to assembly. The wedging action gives a mechanical gripping of the insert with the groove 19 and cooperative rib—conveniently being the edge 37 of the recess—providing shear strength. The adhesive increases the strength of the fastening, and also decreases the noise produced during use. Typical dimensions are shown on FIGS. 6 and 7.

Generally, saw blades have a metal body, for example a medium carbon steel, but this is not essential. With the present invention, using the synthetic resin as a bonding agent, is it possible to use other materials. For example, the blade body can be molded, using a high strength synthetic resin material. Clamping can still be obtained, either by using a pin to deform the seating, or by a wedging action, both as described above. A high level of dimensional accuracy is obtainable with molding and minimal, or no machining may be necessary.

While being described, and illustrated, as applied to a circular saw blade, the invention can readily be applied to other blade forms, for example, straight saw blades. The power required for cutting is reduced and the production life is increased, for example, up to twenty times longer.

It will be appreciated that the invention, as described and illustrated, relates to the present technology level of sintered ceramics and synthetic resin adhesives. The strength of sintered ceramics is being improved continuously, as is the joint strength of synthetic resins. Such improvements will lead to improvements in the saw blades as made in accordance with the present invention.

While cooperative grooves and ribs have been described and illustrated, other forms of cooperative formations can be provided.

What is claimed is:

1. A saw blade comprising a body and a plurality of cutting members positioned in seatings in said body; each seating having front and back walls and a bottom, and each cutting member having front and back surfaces; a groove in each said front surface and a groove in each said back surface of each cutting member, said grooves extending in the direction of the length of each cutting member; each cutting member extending laterally on each side of said body and each groove having a width substantially equal to the thickness of said body; said body having a plurality of rib members, each rib member extending into one of said grooves to provide lateral location of each of said cutting members in said body; said front wall of each seating being defined by a slot extending radially into said body and spaced from the seating; an aperture at a bottom end of each slot, positioned below said bottom of each of said seatings; an oversize pin driven into each aperture to urge said front wall toward said back wall into a clamping engagement with the cutting member in the seating; and a layer of synthetic resin adhesive between each cutting member and seating.

2. A saw blade as claimed in claim 1, said saw blade being a circular saw blade.

3. A saw blade as claimed in claim 1, each of said back walls extending substantially to a top of the back surface of each of the cutting members.

4. A saw blade as claimed in claim 1, each cutting member comprising a sintered ceramic insert.

5. A saw blade as claimed in claim 1, said blade body being of steel.

6. A saw blade as claimed in claim 1, said blade body being of molded synthetic resin material.

* * * * *